(12) United States Patent
Ibuka et al.

(10) Patent No.: US 8,039,157 B2
(45) Date of Patent: Oct. 18, 2011

(54) STARTUP METHOD FOR FUEL CELL STACK STRUCTURE, TEMPERATURE CONTROL METHOD FOR FUEL CELL STACK STRUCTURE, AND FUEL CELL STACK STRUCTURE

(75) Inventors: Shigeo Ibuka, Ebina (JP); Keiko Kushibiki, Fujisawa (JP); Souichi Fujiwara, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1133 days.

(21) Appl. No.: 11/722,133

(22) PCT Filed: Dec. 1, 2005

(86) PCT No.: PCT/JP2005/022511
§ 371 (c)(1), (2), (4) Date: Jun. 19, 2007

(87) PCT Pub. No.: WO2006/067971
PCT Pub. Date: Jun. 29, 2006

(65) Prior Publication Data
US 2009/0092866 A1    Apr. 9, 2009

(30) Foreign Application Priority Data

Dec. 21, 2004  (JP) ................................. 2004-368704
Apr. 26, 2005  (JP) ................................. 2005-128453

(51) Int. Cl.
*H01M 8/04* (2006.01)
(52) U.S. Cl. ........................................ 429/442; 429/433
(58) Field of Classification Search ........... 429/433–442
See application file for complete search history.

(56) References Cited

U.S. PATENT DOCUMENTS

| 3,365,334 A | 1/1968 | Thellmann |
| 3,526,549 A | 9/1970 | Archer et al. |
| 5,378,247 A | 1/1995 | Sasaki et al. |
| 5,514,487 A | 5/1996 | Washington et al. |
| 5,906,898 A | 5/1999 | Pondo |

(Continued)

FOREIGN PATENT DOCUMENTS

DE    102 38 860 A1    3/2004

(Continued)

OTHER PUBLICATIONS

Keiko Kushibiki et al., USPTO Office Action, U.S. Appl. No. 11/628,721, filed Jul. 6, 2010, 41 pages.

(Continued)

*Primary Examiner* — Patrick Joseph Ryan
*Assistant Examiner* — Muhammad Siddiquee
(74) *Attorney, Agent, or Firm* — Foley & Lardner LLP

(57) ABSTRACT

A fuel cell stack structure and a method of starting up the fuel cell stack structure are disclosed. The fuel cell stack structure includes a stack of a plurality of solid electrolyte fuel cells, each equipped with a solid electrolyte simplex cell accommodated in a cell space surrounded by a metallic thin plate-like separator and having one surface exposed to the outside, and a gas flow channel formed in and extending through the solid electrolyte fuel cells to supply gas to the respective cell space areas of the solid electrolyte fuel cells, wherein an area with high-heat capacity is preferentially supplied with and heated by high temperature gas at the stage of increasing temperatures of the plurality of solid electrolyte fuel cells during startup thereof.

12 Claims, 12 Drawing Sheets

U.S. PATENT DOCUMENTS

| | | |
|---|---|---|
| 6,245,453 B1 | 6/2001 | Iwase et al. |
| 6,344,290 B1 | 2/2002 | Bossel |
| 6,444,338 B1 | 9/2002 | Araki et al. |
| 6,649,296 B1 | 11/2003 | Minh |
| 6,981,865 B2 | 1/2006 | Kobayashi |
| 7,045,243 B2 | 5/2006 | Kushibiki et al. |
| 7,049,019 B2 | 5/2006 | Tsunoda |
| 7,086,246 B2 | 8/2006 | Yoshii et al. |
| 7,122,267 B2 | 10/2006 | Tsunoda |
| 7,556,873 B2 | 7/2009 | Higashi |
| 2001/0018141 A1 | 8/2001 | Kobayashi |
| 2002/0022204 A1 | 2/2002 | Nagano et al. |
| 2003/0031905 A1 | 2/2003 | Saito et al. |
| 2003/0077500 A1 | 4/2003 | Gorbell |
| 2003/0082423 A1 | 5/2003 | Kushibiki et al. |
| 2004/0018401 A1* | 1/2004 | Fly et al. ............ 429/12 |
| 2004/0028986 A1* | 2/2004 | Tsunoda ............. 429/38 |
| 2004/0086766 A1 | 5/2004 | Hartnack et al. |
| 2004/0086769 A1 | 5/2004 | Diez |
| 2005/0069741 A1* | 3/2005 | Enokizu et al. ...... 429/26 |
| 2007/0218341 A1 | 9/2007 | Kushibiki et al. |
| 2008/0014488 A1 | 1/2008 | Kushibiki et al. |
| 2008/0206614 A1 | 8/2008 | Ibuka et al. |
| 2009/0092866 A1 | 4/2009 | Ibuka et al. |
| 2009/0233141 A1 | 9/2009 | Kushibiki et al. |
| 2010/0015503 A1 | 1/2010 | Yaguchi et al. |

FOREIGN PATENT DOCUMENTS

| | | |
|---|---|---|
| EP | 1 006 601 A2 | 6/2000 |
| EP | 1 261 059 A2 | 11/2002 |
| EP | 1 369 944 A2 | 12/2003 |
| JP | 11-153496 A | 6/1999 |
| JP | 11-162492 A | 6/1999 |
| JP | 2000-173638 A | 6/2000 |
| JP | 2001-235111 A | 8/2001 |
| JP | 2002-008681 A | 1/2002 |
| JP | 2002-61805 (A) | 2/2002 |
| JP | 2002-151106 A | 5/2002 |
| JP | 2003-132933 A | 5/2003 |
| JP | 2004-119298 A | 4/2004 |
| JP | 2004-146343 A | 5/2004 |
| JP | 2004-146345 A | 5/2004 |
| JP | 2004-207067 A | 7/2004 |
| JP | 2004-259615 (A) | 9/2004 |
| JP | 2004-288387 (A) | 10/2004 |
| JP | 2004-288509 (A) | 10/2004 |
| JP | 2004-303462 (A) | 10/2004 |
| JP | 2004-335164 (A) | 11/2004 |
| JP | 2004-335166 (A) | 11/2004 |
| JP | 2005 50691 (A) | 2/2005 |
| WO | WO 2004/004038 A2 | 1/2004 |
| WO | WO 2004/004039 A1 | 1/2004 |
| WO | WO 2004/012282 A2 | 2/2004 |
| WO | WO 2004/021492 A1 | 3/2004 |
| WO | WO 2004/059771 A2 | 7/2004 |
| WO | WO 2004/088334 A1 | 10/2004 |
| WO | WO 2005/109557 A1 | 11/2004 |
| WO | WO 2005/122314 A2 | 12/2005 |

OTHER PUBLICATIONS

Shigeo Ibuka et al. USPTO Office Action, U.S. Appl. No. 11/665,863, filed Aug. 10, 2010, 18 pages.

Shigeo Ibuka et al., USPTO Office Action, U.S. Appl. No. 11/665,863, filed Mar. 15, 2011, 14 pages.

Shigeo Ibuka et al. USPTO Office Action, U.S. Appl. No. 11/665,863, Jun. 21, 2011, 11 pages.

* cited by examiner

STARTUP METHOD FOR FUEL CELL STACK STRUCTURE, TEMPERATURE CONTROL METHOD FOR FUEL CELL STACK STRUCTURE, AND FUEL CELL STACK STRUCTURE

TECHNICAL FIELD

The present invention relates to a startup method for a fuel cell stack structure composed of a stack of solid electrolyte fuel cells (each comprising a unit composed of a separator and cell plate), a temperature control method for the fuel cell stack structure, and the fuel cell stack structure.

BACKGROUND ART

In cases where a fuel cell stack structure is installed on a vehicle, the fuel cell stack structure is frequently started up/stopped, thus, the fuel cell stack structure needs to have low-heat capacity. Since a gas flow channel, through which gas is distributed for supply to respective cell space areas provided with simplex cells, performs a function to ensure strength of the stack, a function to ensure a space between adjacent simplex cells and a function to allow each simplex cell to have gastight sealing effect to supply gas to the simplex cell, an area with high-heat capacity is partially formed in an unavoidable fashion.

While starting up the fuel stack structure with such configuration, since temperature of an area with low-heat capacity is rapidly heated than that of an area with high-heat capacity, a temperature difference between the two areas occurs. Due to the temperature difference, the separator and unit cell of the solid electrolyte fuel cell is damaged.

Further, since temperature of a gas flow channel area with high-heat capacity is low, temperature of gas for generating electric power lowers whereby power output also lowers. That is, uneven temperature variations cause irregularities in power output.

Heretofore, for the purpose of addressing defects described above, a method has heretofore been known wherein fuel gas is combusted in a burner to allow high temperature exhaust gas, resulting from combustion, to be admitted to a fuel electrode flow channel for the heating of the same. In this respect, various proposals have heretofore been made to provide a startup method, in which incomplete combustion is caused to take place in the burner to allow fuel gas to have reducing property under which a fuel electrode is maintained to have reducing property, and an electric power generation system that includes a catalytic combustor disposed in an air flow channel inside a cylindrical cell not only to permit high temperature gas to flow into a catalytic combustor but also to allow heat, developed in the catalytic combustor, to be efficiently transferred to cells (as disclosed in Japanese Laid Open Publication Nos. 11-162492 and 2004-119298).

DISCLOSURE OF THE INVENTION

However, since the conventional fuel cell structure made of a material with high-heat capacity, it takes a long time for the heating and a temperature of an area downstream of a gas stream is raised at a lower rate than that achieved at an area upstream of the gas stream and a temperature difference still remains. Moreover, with the latter electric power generating system descried above, the presence of a structure limited to a cylindrical cell causes a difficulty in production of the cells and encounters an issue with a difficulty in increasing the degree of integration of the stack. Thus, both of these issues remain in question to be addressed in the related art.

The present invention has been made to address the above issues of the related art and has a first object to provide a startup method for a fuel cell stack structure, wherein during startup, a sectional area with high-heat capacity is heated up at an increased temperature rising rate to minimize a difference in temperature between the sectional area with high-heat capacity and another sectional area with low-heat capacity for enabling the suppression of the occurrence of stress concentration while additionally making it possible to prevent a drop in gas temperature resulting from a decrease in temperature of a gas flow channel, and a fuel cell stack structure. Further, it is a second object of the present invention to provide a temperature control method for a fuel cell stack structure, which enables the realization of improvement over durability, and a fuel cell stack structure.

Thus, to achieve such objects, the present invention has the following features: 1) a sectional area, with high-heat capacity, of a gas flow channel is selectively heated up whereas a temperature is caused to develop in another sectional area with low-heat capacity using heat conducted from the sectional area with high-heat capacity; 2) by changing a flow direction of high temperature gas and/or a flow rate of high temperature gas flowing between the areas having high/low heat capacity so that a difference in temperature between the sectional area with high-heat capacity and another sectional area with low-heat capacity to be minimized; 3) temperature measuring devices are disposed in the sectional area with high-heat capacity and another sectional area with low-heat capacity, respectively, to allow the flow of gas to be controlled in a way to minimize the temperature difference in response to data resulting from the temperature measuring devices.

More particularly, the fuel cell stack structure of the present invention has a feature to include a cell plate, on which a simplex cell is mounted, and a separator, both of which has sectional areas, each with an increased thickness, in which through-bores are formed to allow gas to be supplied to or exhausted from a cell space area defined between the cell plate and the separator upon which the cell plate and the separator are stacked to form a unit in a way to allow the through-bores to extend through the unit in a stack direction thereof to define a gas flow channel through which gas is distributed in supply to or exhausted from the cell space areas. Further, the present invention has a feature to have a structure wherein when starting up the fuel cell stack structure with such a structure, a sectional area with high-heat capacity, of a gas flow channel is selectively heated at the stage of heating up a plurality of solid electrolyte fuel cells.

Further, with the fuel cell stack structure with such a structure, gas is supplied to the cell space area through at least one gas flow channel, extending through the stack, whereby an area with high-heat capacity of the gas flow channel is selectively heated at the stage of raising temperature of a plurality of fuel cells during startup operations thereof.

Furthermore, the present invention has a feature to have a structure wherein at respective stages from startup to stop operations of the fuel cell stack structure with a sectional area with high-heat capacity and another sectional area with low-heat capacity, temperatures are measured at plural areas to provide temperature information based on which the operation is executed to control a heat balance of the relevant areas so as to provide a uniform temperature distribution.

Moreover, the present invention features to have a structure wherein a fuel cell stack structure, with a sectional area with high-heat capacity and another sectional area with low-heat capacity, which has plural areas provided with temperature measuring devices, such as thermocouples or thermoviewers, to provide temperature information based on which a heat balance on the relevant areas can be controlled so as to provide a uniform temperature distribution.

With the present invention, in cases where a fuel cell stack structure is comprised of a stack of a circular cell plate, having a center, formed with a metallic gas flow channel, and an outer periphery on which a unit cell is fixedly mounted, and a metallic thin plate-like separator, an area of the central flow channel, close proximity to a center area, has high-heat capacity.

With this stack structure, if heat is supplied from an outer periphery of the stack structure using a heater or high temperature gas, an outer area, which has low-heat capacity and is close to a heat source, is preceded in rising of the temperature with the resultant delay in temperature rise at the area, with high-heat capacity, near the central flow channel. Additionally, even if attempt is made to admit high temperature gas to the same flow channel as that used for generating electric power, the area with low-heat capacity is preceded in heating.

Further with the stack structure, the central gas flow channel is formed in a size ranging from 15 to 25 mm φ and the sectional area, involving an exhaust flow channel, with high-heat capacity is formed in a size ranging from 40 to 60 mm φ with one unit (for instance a solid electrolyte fuel cell) sized in a thickness of approximately 1 to 5 mm and with the present invention, the sectional area, having high-heat capacity, with a size of 40 to 60 mm φ, are selectively heated.

While the present invention will be described below on the premise that the present invention takes the form of an electric power generation system wherein fuel gas is caused to flow into respective cell space areas and air gas is caused to flow to outer areas of the solid electrolyte fuel cells, the present invention may be similarly applied to a case wherein a kind of gases is altered. Moreover, although the stack structure is described below on a premise to be of a central flow channel type provided with a metallic gas flow channel at a center of the stack structure, there is no limit on a shape or a position of the cell plates or the separator plates, as long as the stack structure has in-plane distribution on heat capacity.

BEST MODE FOR CARRYING OUT THE INVENTION

1: Fuel Cell Stack Structure

Now, one embodiment of a fuel cell stack structure according to the present invention is described below with reference to the accompanying drawings. Of course, the present invention is not limited to embodiments described below.

Figure 1:
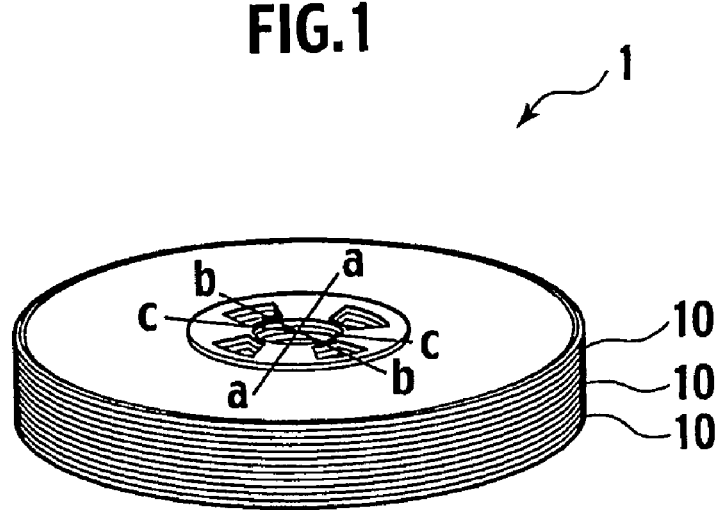
FIG. 1 is an overall perspective and illustrative view showing one embodiment of a fuel cell stack structure according to the present invention.

As shown in FIG. 1, the fuel cell stack structure 1 of the present invention is formed by stacking a plurality of units 10 composed of ten cell plates 12 and separators 13. The units 10, which overlap each other, are bonded to each other using ceramic adhesive including a principal component of alumina. Meanwhile, gas sealing and insulation effects are ensured between adjacent component parts and the fuel cell stack structure 1 is configured such that fuel gas is introduced to insides of solid electrolyte fuel cells 10 and air gas is caused to flow to outer areas of the units 10 for generating electric power.

Figure 2:
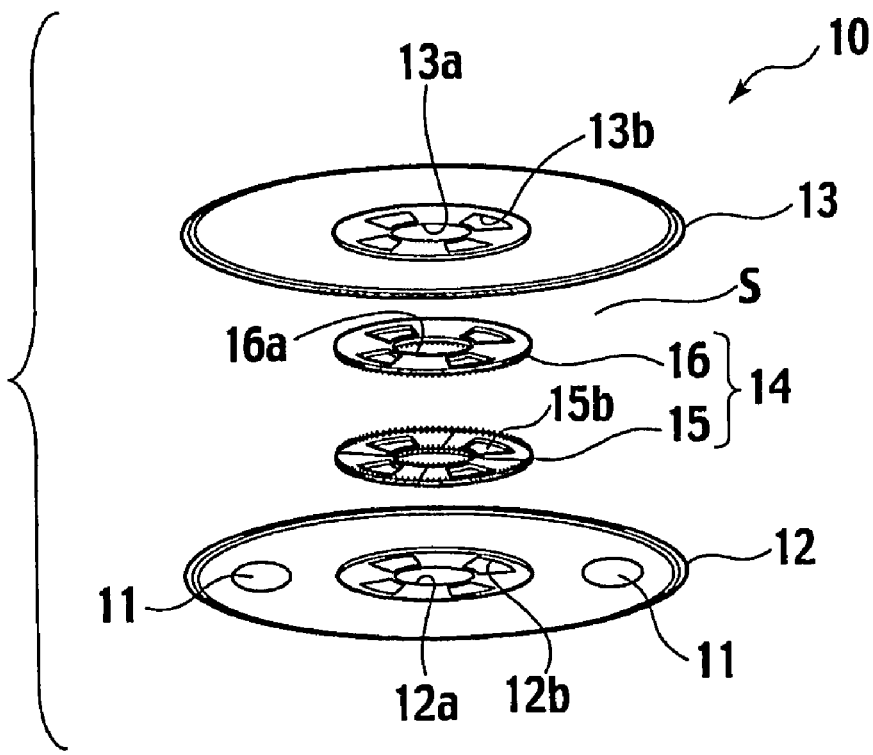
FIG. 2 is an exploded perspective and illustrative view of a unit forming the fuel cell stack structure shown in FIG. 1.

As shown in FIG. 2, each unit 10 is comprised of a plurality of simplex cells 11, a cell plate 12, made of a circular metallic thin sheet and having a center area formed with a gas intake bore 12a and gas exhaust bores 12b, on which the simplex cells 11 are mounted, a separator 13 formed of a circular metallic thin plate like that of the cell plate 12 and having a center area formed with a gas intake bore 13a and gas exhaust bores 13b. With the cell plate 12 and separator 13 mutually facing each other, outer peripheral areas of these component elements are bonded to each other, thereby forming the unit 10.

In this case, a central flow channel member 14 is disposed in a center area of each unit 10 to allow gas to be supplied to and exhausted from a cell space S, defined between the cell plate 12 and the separator 13. The central flow channel member 14 is comprised of a gas exhaust member 15, which has gas exhaust ports 15b in communication with the gas exhaust bores 12b of the cell plate 12, and a gas intake member 16, having a gas intake portion 16a in communication with the gas intake bore 13a of the separator 13, which are mutually bonded to each other.

In this embodiment, the cell plate 12 and the separator 13, formed in respective circular metallic thin plates, are made of rolled sheets, respectively, of SUS 430 with outer diameters of 120 mm and a thickness of 0.1 mm, which were formed in diaphragm shapes, respectively, by press forming. Also, the gas exhaust member 15 and the gas intake member 16, forming the central flow channel member 14, are made of rolled sheets, each formed of SUS 430, in which the gas exhaust ports 15b and the gas intake portion 16a are formed by etching or MIM. The gas exhaust member 15 and the gas intake member 16 are bonded to the cell plate 12 and the separator 13, respectively, by diffusion bonding. In addition, the simplex cells 11 are fixedly mounted on the cell plate 12 under a status with one electrode being exposed to the outside.

Figure 3:
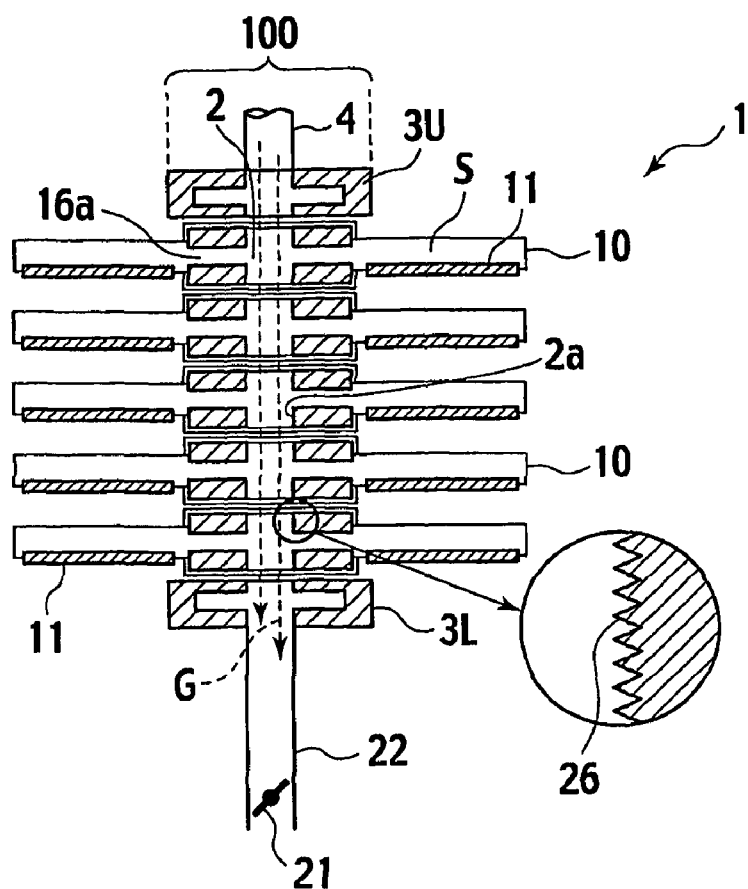
FIG. 3 is a cross sectional and illustrative view, taken on line a-a in FIG. 1, which is shown under a status wherein a valve is open in the fuel cell stack structure shown in FIG. 1.
Figure 4:
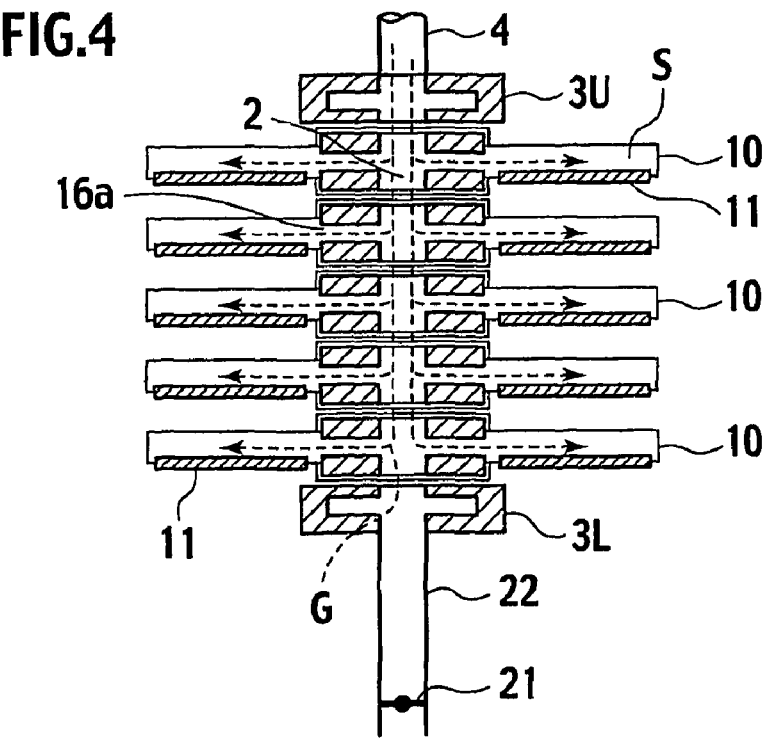
FIG. 4 is a cross sectional and illustrative view, taken on line a-a in FIG. 1, which is shown under a status wherein the valve is closed in the fuel cell stack structure shown in FIG. 1.

With the fuel cell stack structure 1, the units 10 are stacked as shown in FIGS. 3 and 4, to form a gas flow channel (pass-through gas flow channel) 2, whose top end is connected to a gas supply conduit 4 through a flange 3U, which has a bottom end to which a short-circuit flow channel 22, provided with an exhaust valve 21 serving as a flow channel control device to control the flow rate of exhaust gas, is connected through a flange 3L. During startup of the fuel cell stack structure 1, by opening the exhaust valve 21 (under a status shown in FIG. 3) allows major amount of high temperature gas G, which would be supplied from the gas flow channel 2 to the respective cell space areas S of the units 10, to be exhausted intact, thereby enabling only a central flow channel area 100, with high-heat capacity in a position close proximity to the gas flow channel 2 of the units 10, to be heated.

Further, with the fuel cell stack structure 1, the temperature of the area (central flow channel area 100) with high-heat capacity located in the vicinity of the gas flow channel 2 of the units 10 is raised and, thereafter, the exhaust valve 21 is closed (under a status shown in FIG. 4) to cause high temperature gas G to be admitted to the respective cell space areas S of the units 10. This results in temperature rise of the respective cell space areas S each with low-heat capacity to render the fuel cell stack structure 1 to enter a status available for generating electric power.

Figure 5:
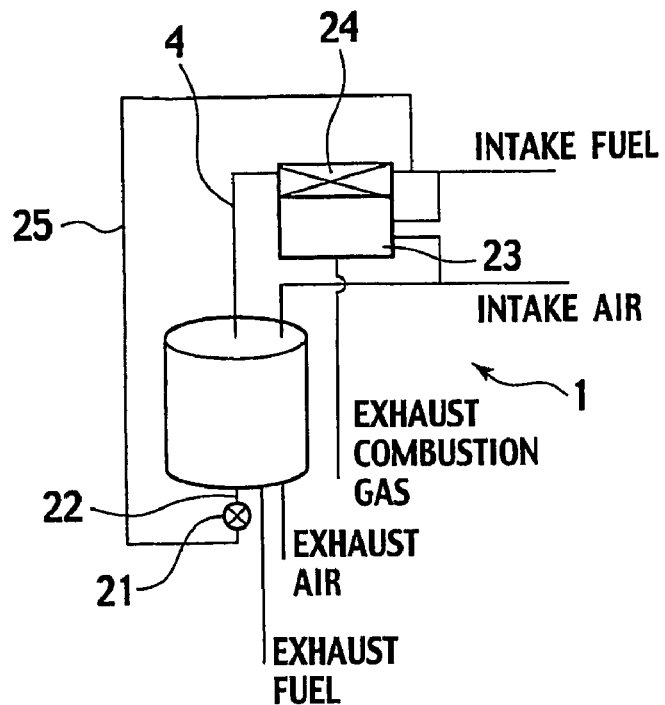
FIG. 5 is an illustrative view showing a flow channel for heating gas to flow to the fuel cell stack structure shown in FIG. 1.

In addition, as shown in FIG. 5, the fuel cell stack structure 1 includes a combustor 23, in which fuel gas is combusted, and a heat exchanger 24 operative to perform heat exchange with combustion heat, resulting from the combustor 23, to heat fuel gas to be admitted to the gas flow channel 2 through the gas supply conduit 4 for thereby providing high temperature gas G. With this embodiment, high temperature gas G, exhausted from the short-circuit flow channel 22, is returned to the heat exchanger 24 again via a circulation flow channel 25 and heated again for reuse.

Moreover, with the fuel cell stack structure 1, as shown in an enlarged circle of FIG. 3, the gas flow channel 2 has a wall surface 2a formed in a sawtooth convexo-concave shape 26 at an area near the flange 3L with high-heat capacity to provide an increased heat receiving surface area. That is, this results in enlargement in a heat receiving surface area and an ease of causing turbulent flow to allow high temperature gas to stay on the wall surface 2a for extended time period, causing heat exchange to easily take place.

With the fuel cell stack structure 1 mentioned above, the short-circuit flow channel 22, incorporating an exhaust valve 21 playing a role as a flow channel control device for controlling the flow rate of exhaust gas, is connected to a lower end of the gas flow channel 2. Therefore, controlling the flow rate of exhaust gas in a manner as set forth above upon operation of the exhaust valve 21 allows a temperature rising rate of an area with high-heat capacity to be selectively increased or precludes a delay in temperature rise of the area with high-heat capacity. As a result, the occurrence of stress concentration arising from a temperature difference between the area with high-heat capacity and the other area with low-heat capacity can be suppressed and, additionally, a drop in temperature of gas flowing through the gas flow channel can be avoided.

Further, opening and closing the exhaust valve 21 enables the area with high-heat capacity to be selectively heated and an area to be heated can be simply altered without the need for locating a complicated moving part in the area that reaches a high temperature.

Furthermore, with the fuel cell stack structure 1 set forth above, the circulation flow channel 25 is provided for permitting high temperature gas, exhausted from the short-circuit flow channel 22, to return to the heat exchanger 24 for circulation, resulting in a capability of efficiently raising the temperature at only the center area while achieving reduction in the amount of gas emission.

Moreover, the fuel cell stack structure 1, set forth above, takes the form of a structure including the heat exchanger 24 operative to perform heat exchange with combustion heat, generated in the combustor 23 in which fuel gas is combusted, to heat gas flowing through the gas flow channel 2 for thereby providing high temperature gas, making it possible to obtain high temperature gas without the use of gas other than fuel gas and electricity. With such a structure, heating gas may include any of oxidizer gas and fuel gas and is pertinent when interiors of the units 10 include fuel electrodes and reducible gas is caused to flow for raising the temperature.

Figure 6:
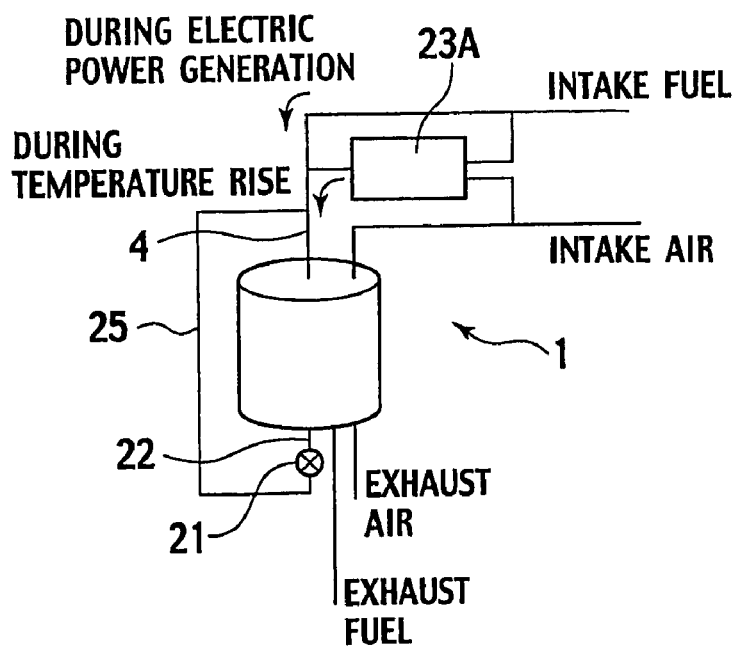
FIG. 6 is an illustrative view showing another flow channel for heating gas to flow to the fuel cell stack structure shown in FIG. 1.
Figure 7:
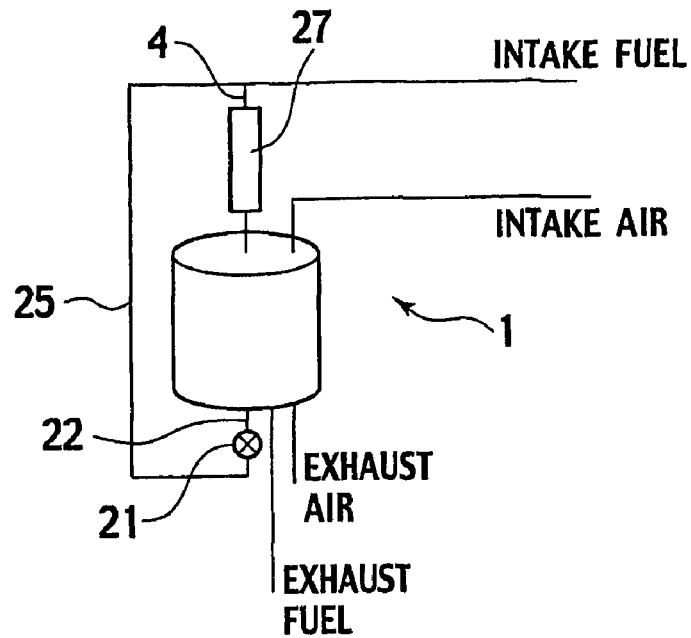
FIG. 7 is an illustrative view showing still another flow channel for heating gas to flow to the fuel cell stack structure shown in FIG. 1.

While the fuel cell stack structure 1 takes the form of a structure that includes the combustor 23, in which fuel gas is combusted, and the heat exchanger 24 operative to perform heat exchange with combustion heat, generated in the combustor 23, to heat gas flowing through the gas flow channel 2 for thereby providing high temperature gas, an alternative may take the form of a structure including a combustor 23A, functions as another heating gas generating device, in which fuel gas is combusted to allow combustion exhaust gas, remaining at a high temperature, to flow into the gas flow channel 2 as shown in FIG. 6. As shown in FIG. 7, another alternative structure may be suitably adopted wherein an electric heating mechanism 27, such as a resistor wire or an electric heater, is mounted on an outside of the gas supply conduit 4 to which the gas flow channel 2 is connected.

With the use of such a former structure, combustion exhaust gas at high temperature, generated in the combustor 23A, can be used intact as heating gas, resulting in a capability of obtaining high temperature gas without the use of electricity and gas other than fuel gas. However, since oxidizer gas flows into the interiors of the units 10, it is needed to coat the fuel electrodes, current collectors and separators for preventing oxidizing when the interiors include the fuel electrodes.

In contrast, the use of the latter structure may result in a capability for heating gas to be composed of any of oxidizer gas and fuel gas that are pertinent when the interiors of the units 10 include the fuel electrodes and reducible gas is caused to flow for raising the temperature.

Figure 8:
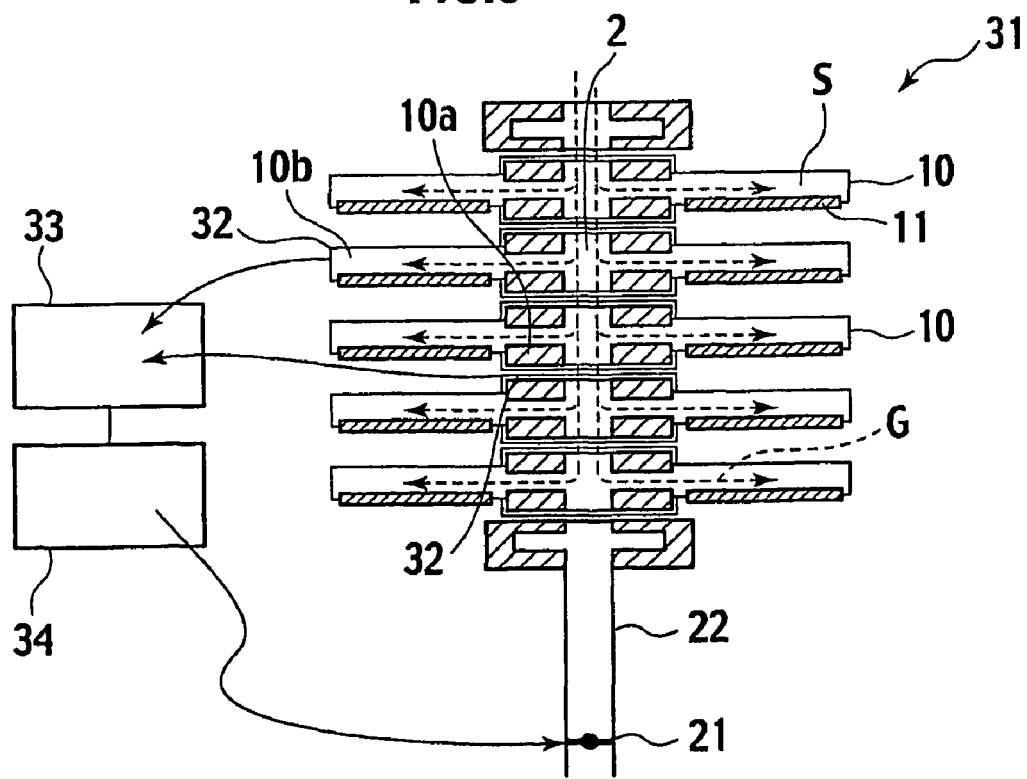
FIG. 8 is a cross sectional and illustrative view, based on a position corresponding to line a-a in FIG. 1, of another embodiment of a fuel cell stack structure according to the present invention under a status wherein the valve is closed.

FIG. 8 shows another embodiment of a fuel cell stack structure 31 according to the present invention. As shown in FIG. 8, the fuel cell stack structure 31 differs from the fuel cell stack structure 1 of the preceding embodiment, set forth above, in that the fuel cell stack structure 31 includes two thermocouples 32 disposed in the unit 10 at a center area 10a, with high-heat capacity, and an outer area 10b with low-heat capacity, respectively, functions as temperature sensors, a monitor 33 connected to the thermocouples 32, and a valve controller (controller) 34 operative to actuate the exhaust valve 21 in response to temperature data, detected by the thermocouples 32, which are displayed over the monitor 33 for thereby regulating the flow rate of high temperature gas G to be exhausted via the short-circuit flow channel 21 and is similar in other respect to the fuel cell stack structure 1 of the previous embodiment.

With the fuel cell stack structure 31, operating the valve controller 34 to close the exhaust valve 21 during stages of the temperatures, displayed over the monitor 33, of the center area 10a exceeding a predetermined temperature causes high temperature gas G to flow nowhere else and automatically flow into the cell space areas S of the units 10 due to an internal structure of the fuel cell stack structure 31. This enables the outer area 10b to be heated followed by the heating of the center area 10a, that is, a whole of the fuel cell stack structure 31 can be rapidly heated in uniform temperature distribution during temperature rise.

Thus, the temperature rising rate of the outer area 10b can be regulated upon varying the opening degree of the exhaust valve 21. Further, with respect to the temperature rising rate of the center area 10a, if high temperature gas G, flowing through the central gas flow channel 2, has an excessively high flow velocity, less heat exchange will take place with the resultant decrease in the temperature rising rate, causing a probability to occur with a need for regulating the flow rate of gas flowing to an exhaust side for the purpose of adjusting the temperature rising rate of the center area 10a during the heating thereof.

Figure 9:
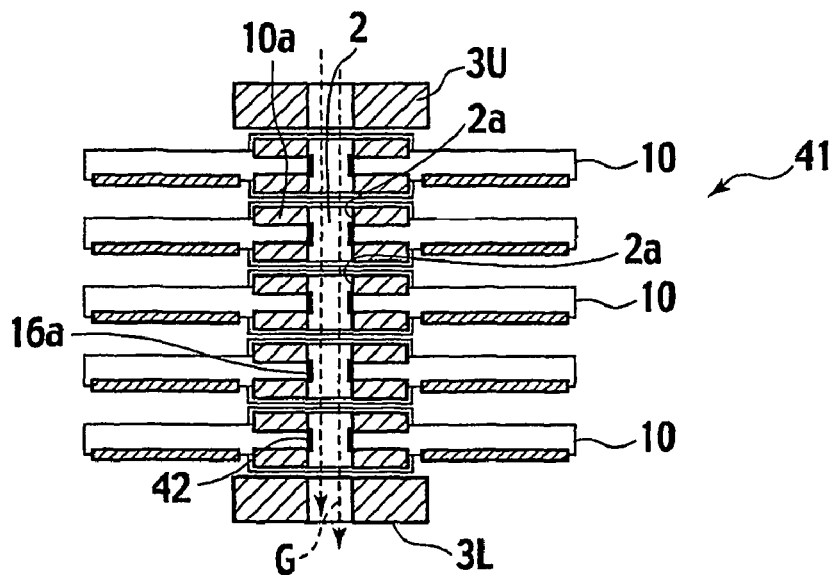
FIG. 9 is a cross sectional and illustrative view, based on a position corresponding to line a-a in FIG. 1, of still another embodiment of a fuel cell stack structure according to the present invention under a status wherein the valve is closed with a metallic cylinder.
Figure 10:
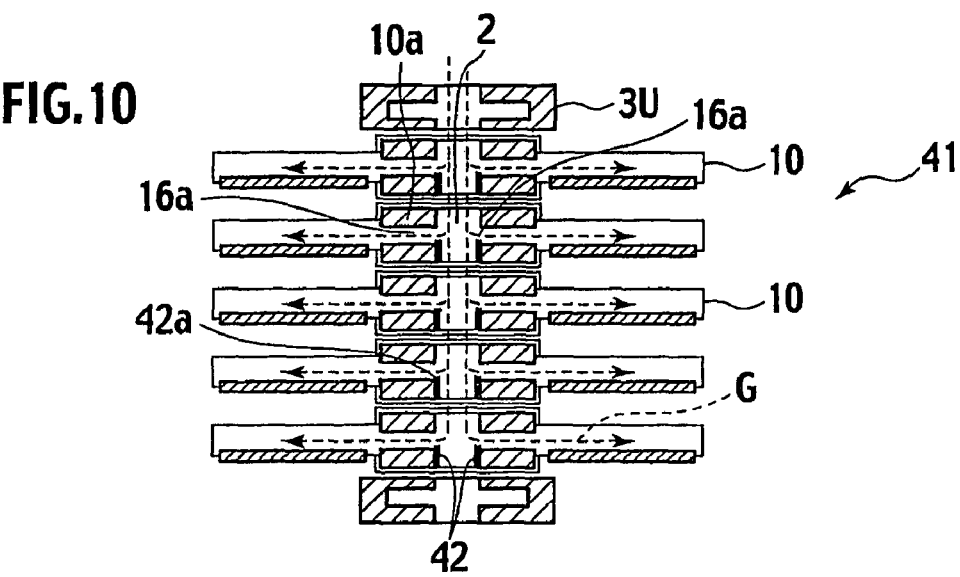
FIG. 10 is a cross sectional and illustrative view, based on a position corresponding to line a-a in FIG. 1, of the fuel cell stack structure, shown in FIG. 9, under a status wherein gas intake ports are closed.

FIGS. 9 and 10 show a still another embodiment of a fuel cell stack structure according to the present invention. As shown in FIGS. 9 and 10, a fuel cell stack structure 41 takes the form of a structure that can be suitably used under situations where no difference exists in flow resistance between a flow passage to the unit 10 and the short-circuit flow channel 22, in other words, under situations where the amount of high temperature gas G, flowing into the unit 10, increases and the center area 10a becomes hard to be selectively heated.

That is, with the fuel cell stack structure 41, a metallic cylinder 42 is disposed in tight contact with a wall surface 2a of the central gas flow channel 2 and has apertures 42a formed in alignment with the respective gas intake ports 16a of the plurality of units 10. By lifting and lowering or rotating the metallic cylinder 42, the gas intake ports 16a is opened or closed. By taking the form of such a structure, the areas to be heated can be altered even in cases where no difference exists in flow resistance between the flow passages.

Figure 11:
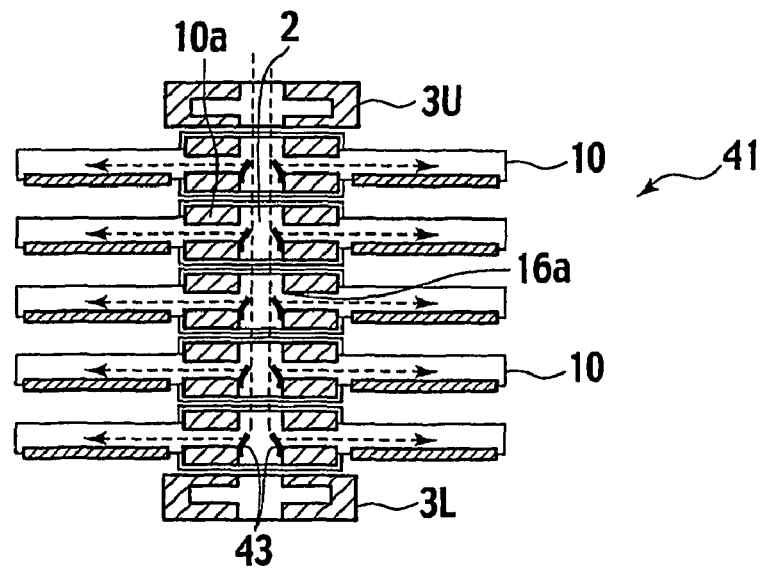
FIG. 11 is a cross sectional and illustrative view, based on a position corresponding to line a-a in FIG. 1, of still another embodiment of a fuel cell stack structure according to the present invention under a status wherein gas intake ports are closed with low fragments.

FIG. 11 shows a modified form of the fuel cell stack structure 41, set forth above, and with this modified form, small segments 43, each formed of a stack of two materials different in thermal expansion coefficients, have one ends connected to vicinities of the gas intake ports 16a. Causing the small segment 43 to deform due to a difference in thermal expansion coefficients thereof during the heating of the center area 10a allows the gas intake port 16a to be opened. With such a structure, it becomes possible to obtain the same shutter function as that of the fuel cell stack structure 41 on which the metallic cylinder 42, set forth above, is mounted. In particular, forming a film of ceramic material, such as alumina, with a thickness of 10 μm on a sheet of heat-resistant stainless steel with a thickness of approximately 50 μm results in the occurrence of deformation due to a difference in thermal expansion coefficient accompanied by an increase in temperature. The film of ceramic may be preferably formed using a sputtering method, a CVD method, a spray method and an AD method.

Figure 12:
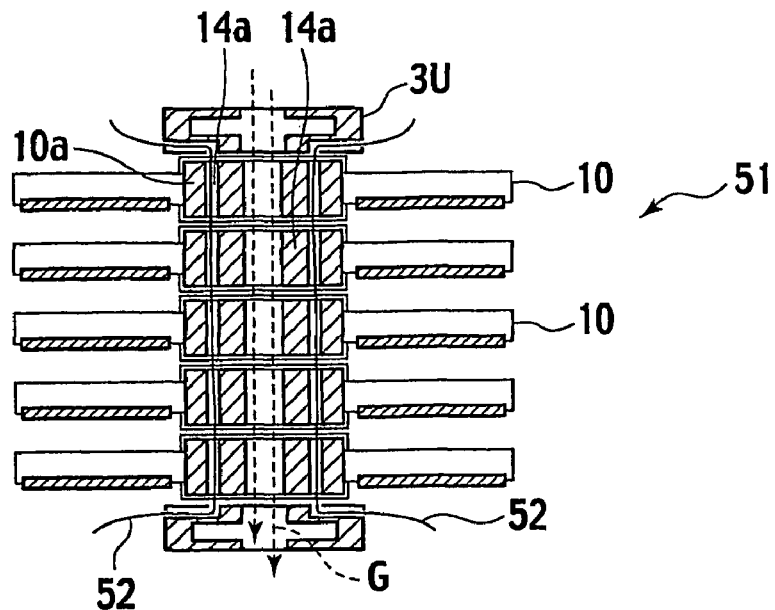
FIG. 12 is a cross sectional and illustrative view, based on a position corresponding to line c-c in FIG. 1, of yet another embodiment of a fuel cell stack structure according to the present invention.

FIG. 12 shows another modified form of the fuel cell stack structure according to the present invention. As shown in FIG. 12, a fuel cell stack structure 51 is structured such that center areas 10a of the units 10 are formed with vertically extending through-bores 14a in which heater wires (heating elements) 52 are inserted.

With such a fuel cell stack structure 51, supplying electric power to the heater wires 52 allows the center areas 10a to be heated with the resultant increase in the temperature rising rate. Each heater wire 52 may possibly include a general-purpose heater wire formed of material such as Ni—Cr. With such a structure, no need arises for providing the circulation flow channel 25 set forth above, enabling a system to be simplified. Also, the number of heater wires 52 and heating values may be determined in consideration of power consumption related to the temperature rise.

Tests have been conducted to measure temperature variations at the center areas and the outer areas of the fuel cell stack structures 1, 31, 41, 51, set forth above, during startup operations thereof and temperature variations at the center areas and the outer area appearing when heating the fuel cell stack structure with heaters placed at an outer periphery of the stack structure during startup thereof, resulting in results mentioned below.

Figure 13:
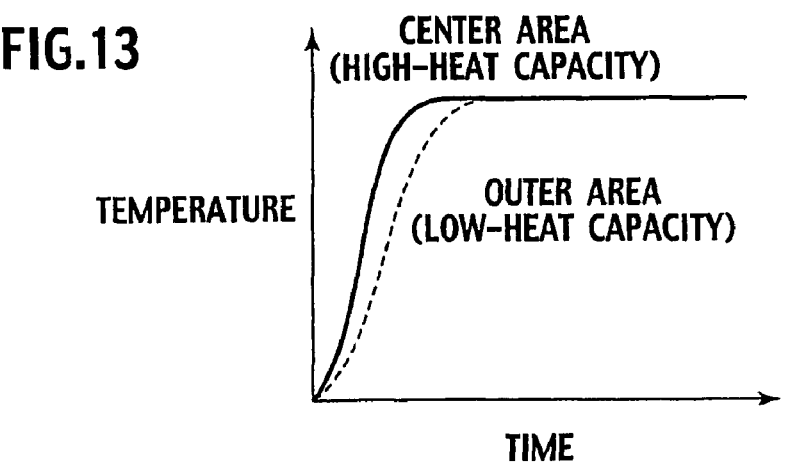
FIG. 13 is a graph showing temperature variations at a center area and outer area of the fuel cell stack structure according to the present invention during startup thereof.
Figure 14:
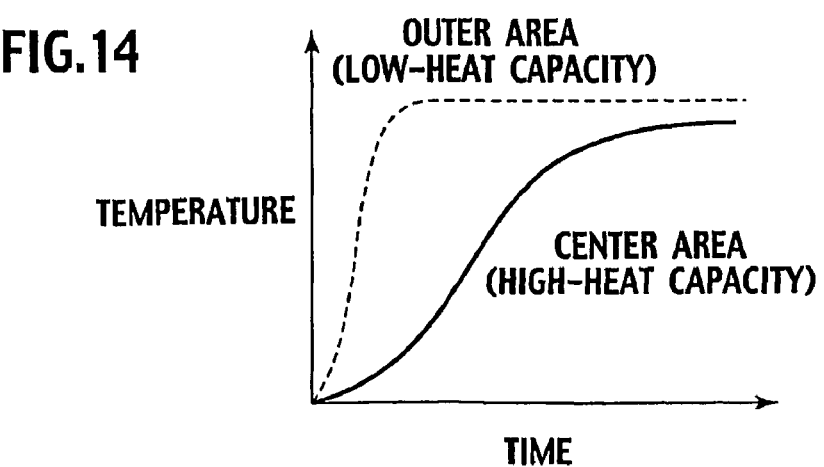
FIG. 14 is a graph showing temperature variations at a center area and outer area, at which a heater is located for the heating, of a fuel cell stack structure of the related art during startup thereof.

As shown in FIG. 14, under a situation where the heater is placed in the outer area, the center area has high-heat capacity and has a difficulty to directly receive heat radiated from the heater, resulting in an increase in temperature difference between the center area and the outer area during temperature rise. On the contrary, as shown in FIG. 13, since the fuel cell stack structures 1, 31, 41, 51 are configured to preferentially heat the center area with high-heat capacity, the temperature of the center area rapidly increases and the temperature of the outer area with low-heat capacity is caused to increase due to heat conducted from the center area, resulting in a decrease in the temperature difference between the center area, whose temperature is raised, and the outer area.

Accordingly, the fuel cell stack structures 1, 31, 41, 51 could demonstrate that increasing the temperature rising rate of the area with high-heat capacity in a selective fashion or preventing a delay in temperature rise during startup minimized the temperature difference between the area with high-heat capacity and the area with low-heat capacity.

Yet another embodiments of the present invention are described below with reference to FIG. 15 and associated drawings.

A fuel cell stack structure 61 of the presently filed embodiment includes sheath thermocouples 32, bonded to a center area 10a, with high-heat capacity, and an outer area 10b, with low-heat capacity, of the units 10 at two positions by using stainless putty, which play roles as temperature measuring devices, respectively, a controller 35 connected to the sheath thermocouples 32 for converting a potential difference into a temperature, and a valve controller 34 operative to actuate a flow intake valve 20 and an exhaust valve 21 in response to commands from the controller 35. At the stage wherein a temperature, converted by the controller 35 based on data resulting from the sheath thermocouples 32, of the center area 10a exceeds a predetermined temperature, the valve controller 34 is operative to close the exhaust valve 21 to permit high temperature gas G to flow into the units 10 whereby the outer area 10b is enabled to be heated in succession to the heating of the center area 10a, that is, a whole of the fuel cell stack structure 61 can be rapidly heated in a uniform temperature distribution pattern during warm-up.

Figure 15:
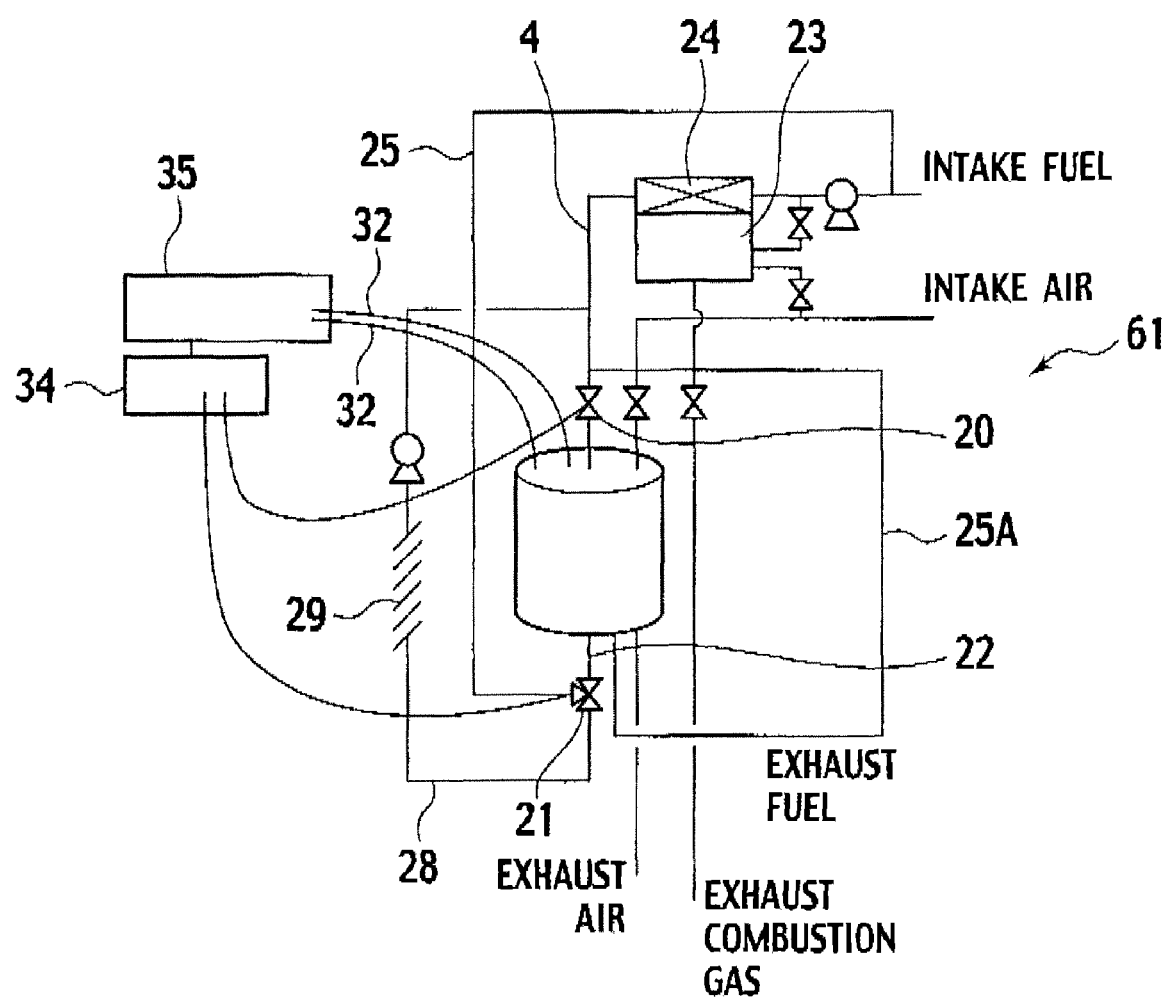
FIG. 15 is an illustrative view showing a flow channel through which heating gas is supplied to a fuel cell stack structure of still another embodiment according to the present invention.

Further, as shown in FIG. 15, the fuel cell stack structure 61 includes the combustor 23 for combustion of fuel gas, and the heat exchanger 24 operative to perform heat exchange with combustion heat caused in the combustor 23 to heat fuel gas flowing into the gas flow channel 2 via the gas supply conduit 4. This embodiment is configured such that high temperature gas, expelled from the short-circuit flow channel 22, is caused to return to the heat exchanger 24 through the circulation flow channel 25 for reheating in use and high temperature gas, exhausted from the fuel cell stack structure 61, is returned through the circulation flow channel 25A to an upstream of the flow intake valve 20 for reuse. In addition, a circulation flow channel 28 is connected between the gas supply conduit 4, at an upstream of the flow intake valve 20, and the exhaust valve 21 for temperature regulation and includes a heat radiator 29 operative to perform heat exchange with air or water to obtain low temperature gas.

Figure 16:
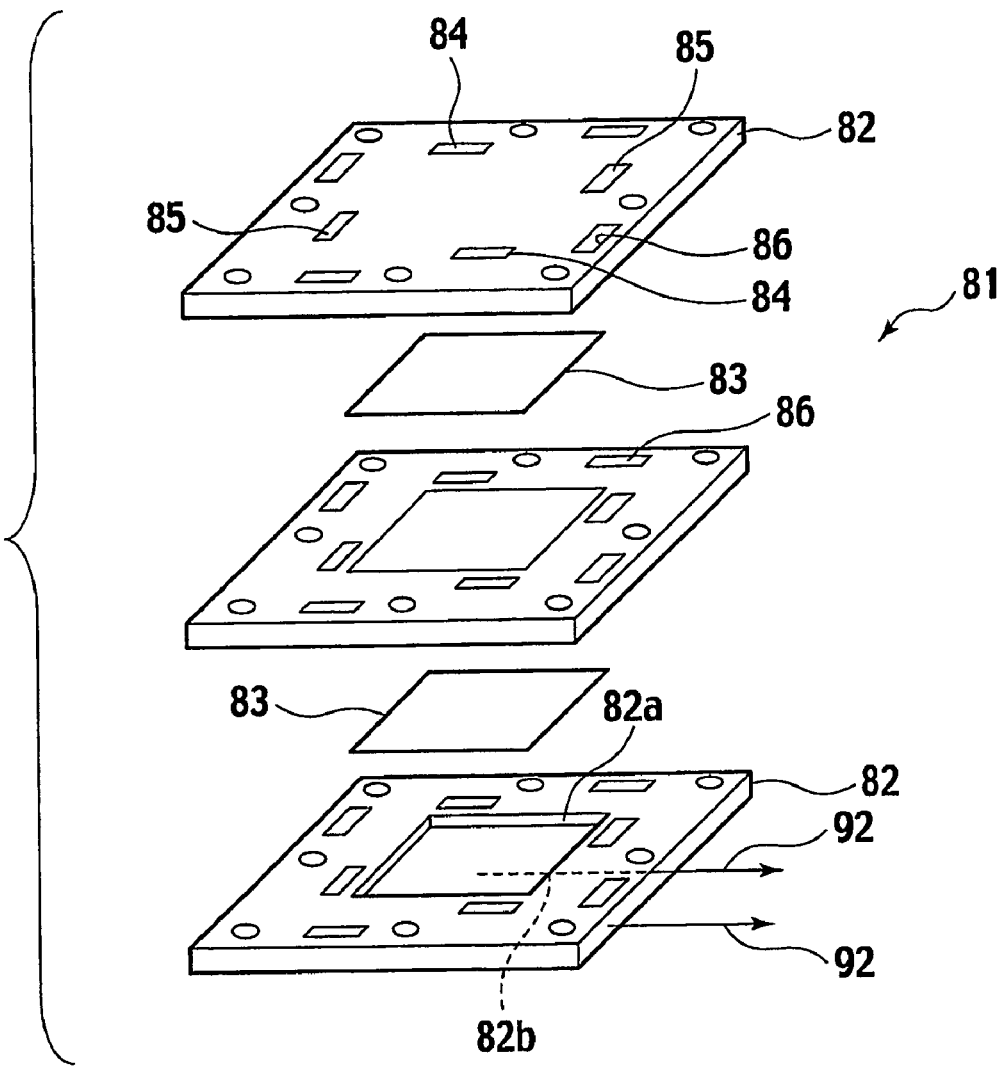
FIG. 16 is an exploded perspective and illustrative view showing still another embodiment of a fuel cell stack structure according to the present invention.

FIG. 16 shows a modified form of a fuel cell stack structure according to the present invention and, as shown in FIG. 16, the fuel cell stack structure 81 has a structure formed in a rectangular shape (substantially square-shape). Each of separators 82 has a center area, formed with a cavity 82a for accommodating therein a current collector 83, which functions as an area with low-heat capacity whereas a peripheral area of the separator 82 functions as an area with high-heat capacity. With the fuel cell stack structure 81, the peripheral area is formed with a temperature regulating gas flow channel 86 to be separate from fuel flow channels 84 and airflow channels 85. This results in a capability for the peripheral area with high-heat capacity to be cooled. Temperature measuring devices include thermocouples 92, one of which functions as a unit that is fixed to a through-bore 82b formed in the separator 82 so as to extend toward a center area thereof to monitor a temperature thereof and the other one of which functions as a unit that is mounted on an outer wall of the separator 82 to monitor an area with high-heat capacity. The thermocouples 92 are bonded to relevant parts by Pt paste or ceramic putty.

Thus, the fuel cell stack structure 81 has the temperature regulating gas flow channel 86 formed to be independent from the fuel flow channels 84 and the airflow channels 85 whereby regulating the flow rate of low temperature gas flowing through the gas flow channel 86 at the stage from startup to stop operations of the system enables the suppression of the occurrence of stress concentration due to temperature difference between the area with high-heat capacity and the other area with low-heat capacity.

2: Temperature Control Method for Stack Structure

Now, description is made of a temperature control method suited for the fuel cell stack structure described above.

According to a feature of the present invention, the fuel cell stack structure has a structure that includes a short-circuit flow channel operative to allow a major amount of high temperature gas, supplied from the gas flow channel to the respective cell space areas of the units, to be exhausted intact, a flow channel control device operative to restore a status under which the short-circuit flow channel is closed to supply high temperature gas from the gas flow channel to the respective cell space areas of the units, and a controller operative to actuate the flow channel control device for regulating the flow rate of high temperature gas to be exhausted through the short-circuit flow channel in response to temperature information resulting from the temperature measuring devices. With such a structure, a flow ratio between high temperature gas, to be supplied from the gas flow channel to the respective cell space areas, and high temperature gas, to be exhausted through the short-circuit flow channel, is regulated for the purpose of minimizing a difference between the temperatures measured at two points during a stage from startup to stop operations. Thus, an area, with high-heat capacity, of the gas flow channel of the fuel cell stack structure is preferentially heated, while enabling an increase in the flow rate of gas admitted to the fuel cell stack structure according to needs.

Figure 17:
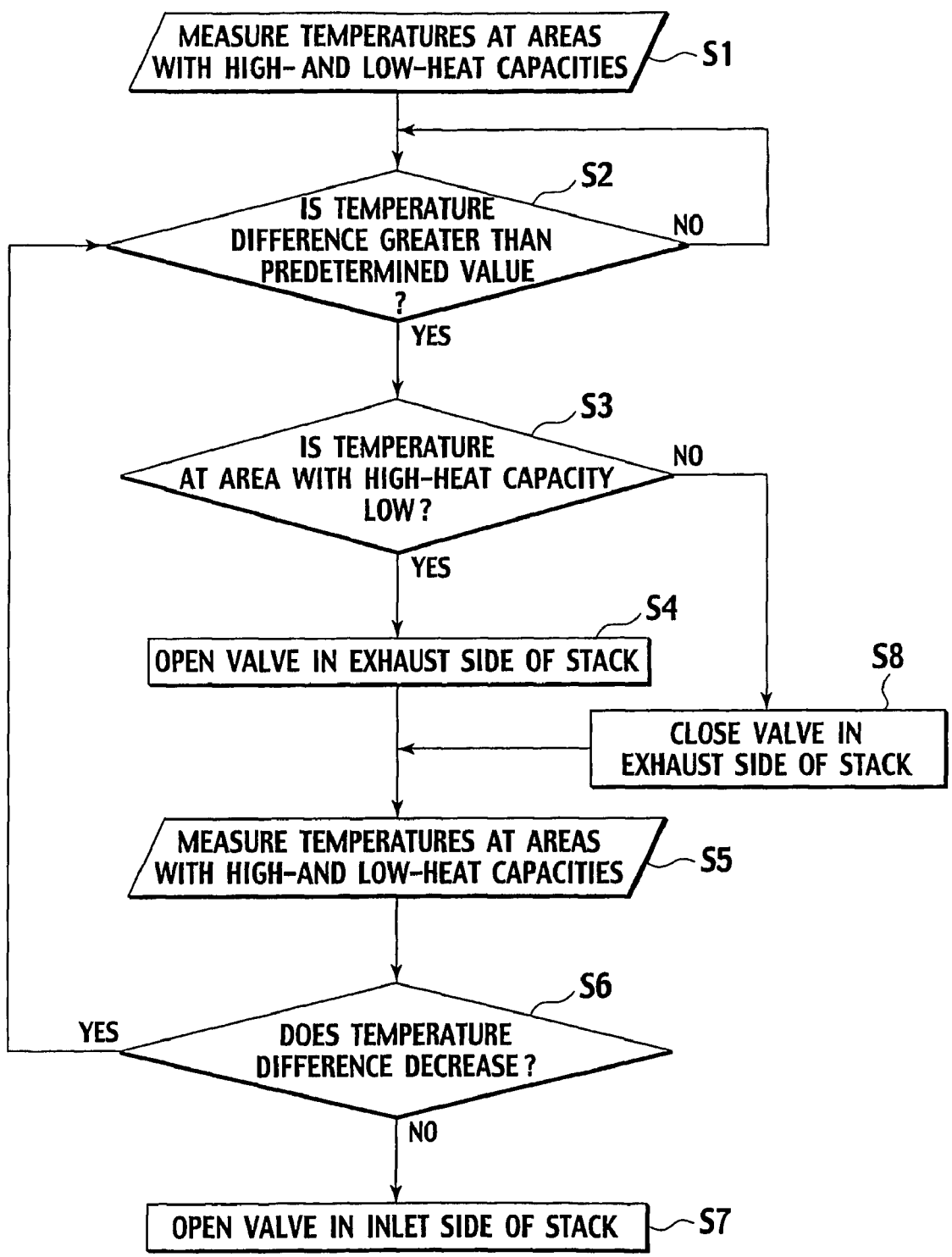
FIG. 17 is a temperature distribution control flowchart for temperature rise in the fuel cell stack structure according to the present invention.

More particularly, as shown in a temperature distribution control flowchart during temperature rise (FIG. 17), when the relationship: (temperature at the central flow channel)<(temperature at the cell space area) is satisfied, the thermocouples, functioning as respective temperature measuring devices, are fixedly mounted on two positions, covering an area (central flow channel portion) with high-heat capacity in a position close proximity to the gas flow channel and the other area (cell space area) with low-heat capacity, respectively, to perform the following steps. That is, in step S1, temperatures are monitored at the respective points whereby when in steps S2, S3, a difference in temperature between the area with high-heat capacity and the other area with low-heat capacity exceeds a predetermined value and the temperature of the area with high-heat capacity remains at a low level, it is controlled so that the flow channel control device is actuated (to open the exhaust valve) in step S4 to exhaust high temperature gas through the short-circuit flow channel. Then, in steps S5, S6, the operation is executed such that the area with high-heat capacity in the vicinity of the gas flow channel of the fuel cell stack is heated until the temperature difference, mentioned above, is minimized. If no temperature difference decreases, then, the operation is executed in step S7 to increase the flow rate of gas, flowing into the fuel cell stack structure, depending on needs. Also, such controls may be realized using the controllers 34, shown in FIGS. 8 and 15, or using the other control device that is not shown.

Then, at the stage wherein a difference in temperature between the area with high-heat capacity and the other area with low-heat capacity exceeds the preset value in steps S2, S3 and the temperature of the area with high-heat capacity increases to a high level, operating the flow channel control device (to close the exhaust valve) in step S8 causes gas to flow nowhere else whereby gas is caused to flow into the insides of the units. This makes it possible to heat the area with low-heat capacity subsequent to the occurrence of the heating of the area with high-heat capacity. That is, a whole of the fuel cell stack structure can be rapidly heated in a uniform temperature distribution pattern during temperature rise.

Figure 18:
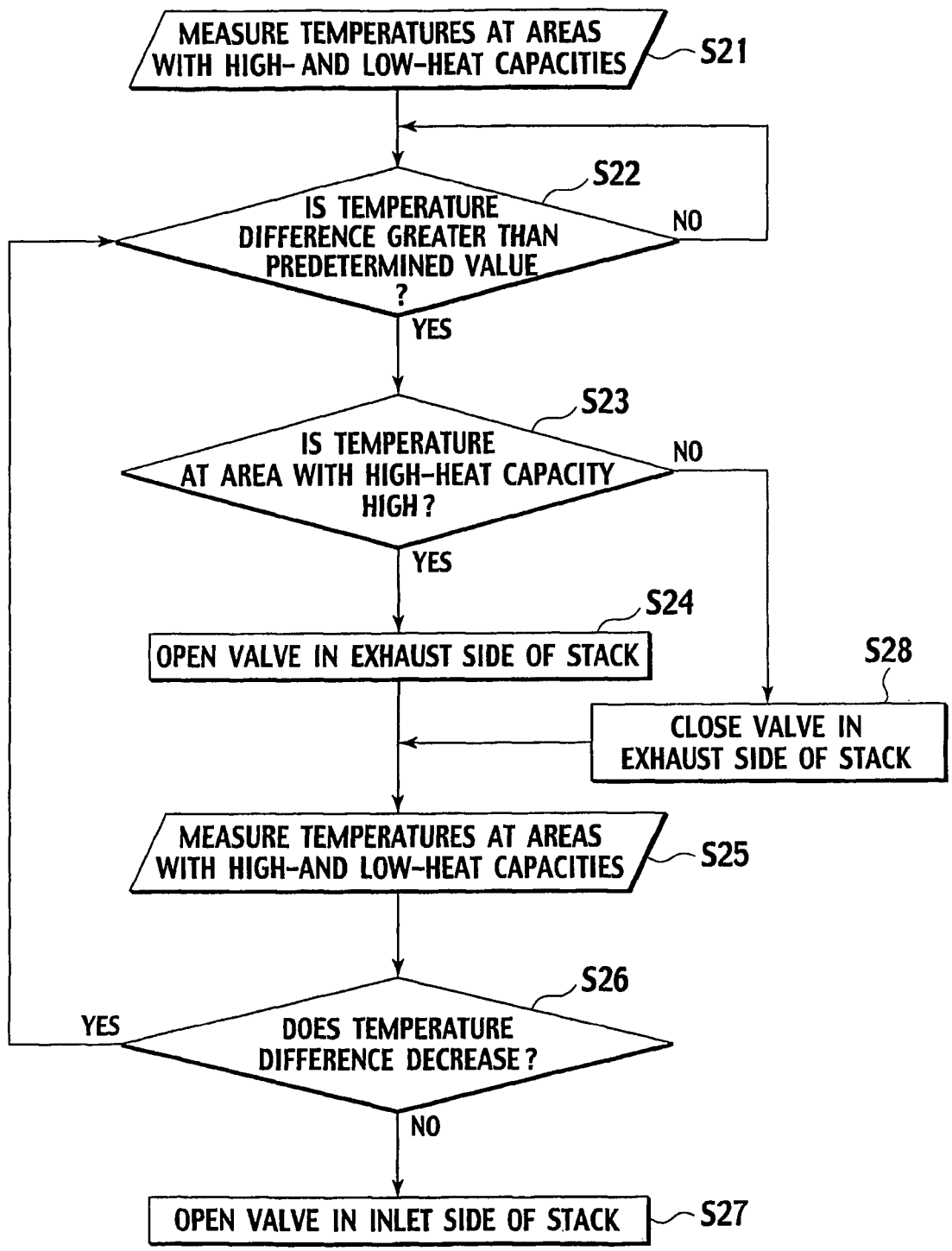
FIG. 18 is a temperature distribution control flowchart for causing a drop in temperature of the fuel cell stack structure according to the present invention.

On the other hand, a control flow to be executed during temperature drop and cooling is shown in FIG. 18. Temperatures at respective points are monitored in step S21 whereby when in steps S22, S23, a difference in temperature between the area with high-heat capacity and the other area with low-heat capacity exceeds a predetermined value and the temperature of the area with high-heat capacity remains at a high level, the flow channel control device is actuated (to open the exhaust valve) in step S24 to exhaust high temperature gas through the short-circuit flow channel and the exhaust valve is continuously opened until the temperature difference, mentioned above, decreases in steps S25, S26. If no temperature difference decreases, then, the operation is executed in step S27 to increase the flow rate of gas flowing into the fuel cell stack structure depending on needs.

Subsequently, at the stage in which in steps S22, S23, the difference in temperature between the area with high-heat capacity and the other area with low-heat capacity exceeds the predetermined value and the temperature of the area with high-heat capacity drops to a low level, actuating the flow channel control device (to close the exhaust valve) in step S28 enables both the area with high-heat capacity and the other area with low-heat capacity to be cooled. Such a control results in a capability for a whole of the fuel cell stack structure to be rapidly cooled in a uniform temperature distribution pattern even during temperature drop.

With the use of such a structure, no need arises for providing a complicated moving element, made of heat-resistant material, in an area that becomes hot in temperature and the fuel cell stack structure becomes simple in structure to such an extent. This makes it possible to simply alter an area, to which gas enters, that is, a heating area by merely operating (merely regulating the opening degree of the valve) the flow channel control device.

Additionally, another alternative may take the form of a structure wherein at the stage of the occurrence with a measured temperature at the cell space area with low-heat capacity exceeding a predetermined level, that is, at the stage when the fuel cell stack structure generates electric power, gas can be effectively utilized for generating electric power. Therefore, a whole of high temperature gas, exhausted through the gas flow channel, is supplied to the cell space areas while regulating only the flow rate of gas, flowing into the fuel cell stack structure, for thereby interrupting the heating at the vicinity of the gas flow channel.

Also, in a case where a circulation flow channel for high temperature gas to circulate is provided in this alternative configuration, two valves or a three-way valve are suitable as a flow channel control device for switching over between the short-circuit flow channel and the circulation flow channel.

Further, the temperature rising and lowering rates of the fuel cell stack structure are controlled upon regulating the flow rate of gas that forms heat medium. As set forth above, since the fuel cell stack structure is configured to perform control so as to minimize the temperature difference between the area with high-heat capacity and the area with low-heat capacity, monitoring and controlling the highest temperature enables the temperature rising rate of the stack structure to be matched with a preset temperature rising rate while permitting a whole of the fuel cell stack structure to be maintained in a uniform temperature.

Figure 19:
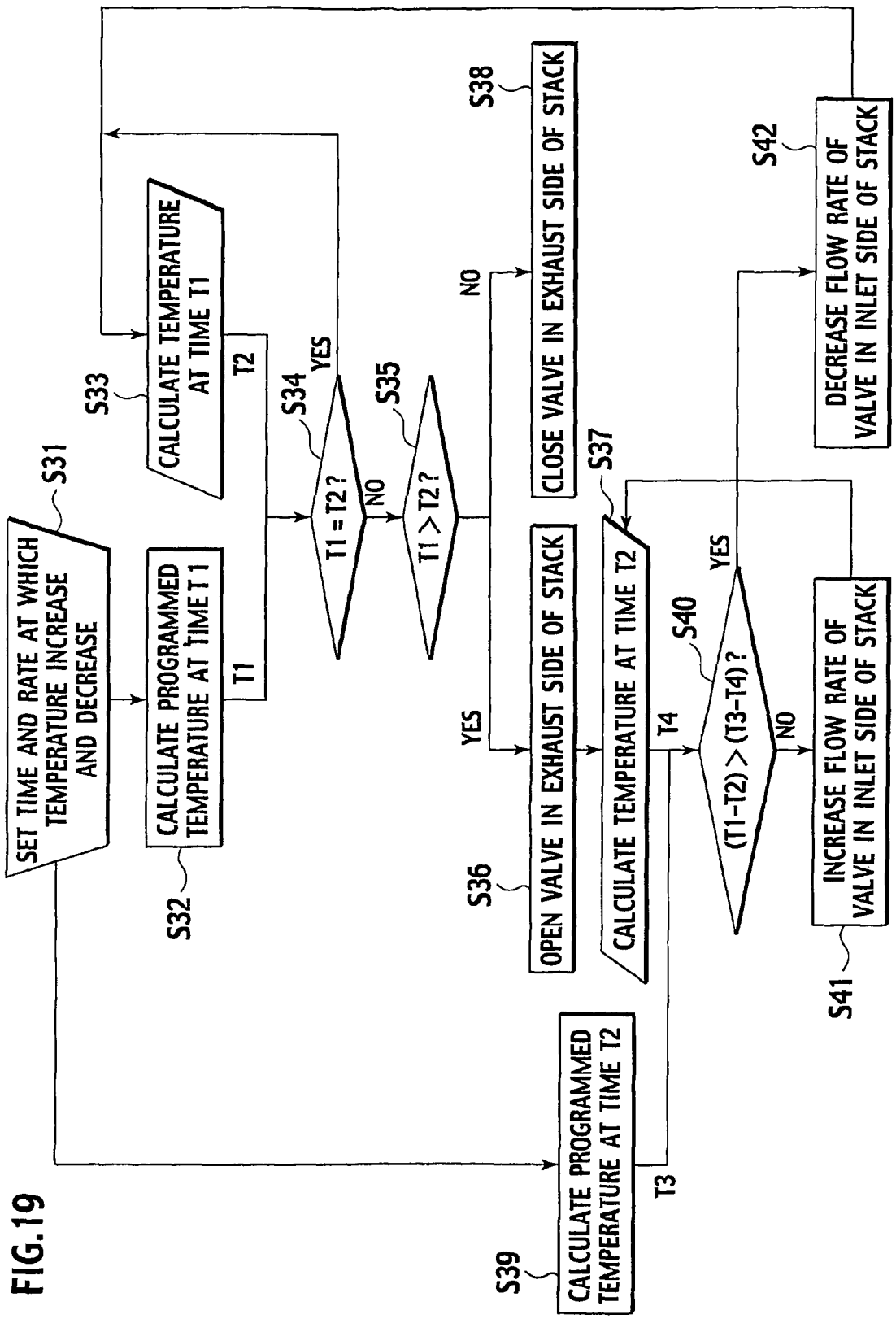
FIG. 19 is a flowchart related to temperature rise and temperature drop speed control for the fuel cell stack structure according to the present invention.

Therefore, the present invention may also take the form of a structure that executes a temperature rising and lowering speed control as shown in a flowchart of FIG. 19. That is, the operations are executed in steps S34, S35 to make comparison between a programmed temperature (a programmed temperature at an arbitrary time calculated based on a temperature lowering time or a temperature lowering rate that are preliminarily set) at an arbitrary time, calculated based on a predetermined temperature rising time or a temperature rising rate in steps S31, S32, and the highest measured temperature (the lowest measured temperature among a plurality of temperature information obtained upon measurements) among a plurality of temperature information measured and obtained in step S33 upon which the operations are executed in steps S36 to S42 to regulate the flow rate of gas, flowing into the fuel cell stack structure, with a view to minimizing a difference between the programmed temperature and the measured temperature.

Additionally, limit values of the temperature rising speed and reaching temperature depend on the flow rate, pressure and temperature of high temperature gas and, in order to increase the limit values of temperature rising speed and reaching temperature, it is needed for increasing the flow rate, pressure and temperature of high temperature gas Since the use of such a structure enables an internal temperature distribution of the fuel cell stack structure to be restricted for controlling the temperature rise and drop, the fuel cell stack structure can be protected from damages resulting from rapid variation in thermal expansion coefficients. In addition, it becomes possible to reduce a stay time in a temperature zone for physical change, such as phase transition or crystal structure change, of constituent material to take place, resulting in improved durability of the stack structure.

With the present invention set forth above, a structure may be adopted in which for the purpose of permitting an area with high-heat capacity to be selectively heated, high temperature gas is caused to preferentially flow into the area with high-heat capacity for heating the same. Another structure may be adopted including a heating element disposed in an area with high-heat capacity at a position close proximity to a simplex cell for heating the same. With such former structure, the area with high-heat capacity is heated in heat exchange with gas to increase a temperature rising rate, resulting in an increase in a temperature rising rate of a whole of the fuel cell stack structure.

With the latter structure, a center area of the fuel cell stack structure is formed with a vertically extending through-bore, to which a heater wire (resistance wire) is inserted, and the center area is heated with the resultant increase in the temperature rising rate. The heater wire may include a commonly used heater wire such as a wire made of Ni—Cr. With such a structure, no need arises for a circulation flow channel to be disposed, resulting in simplification of a system. Further, although it stands that the larger the number of heater wires and the greater the heat value, the higher will be the temperature-rising rate of the center area, electric power consumption required for the temperature rise increases.

Figure 20:
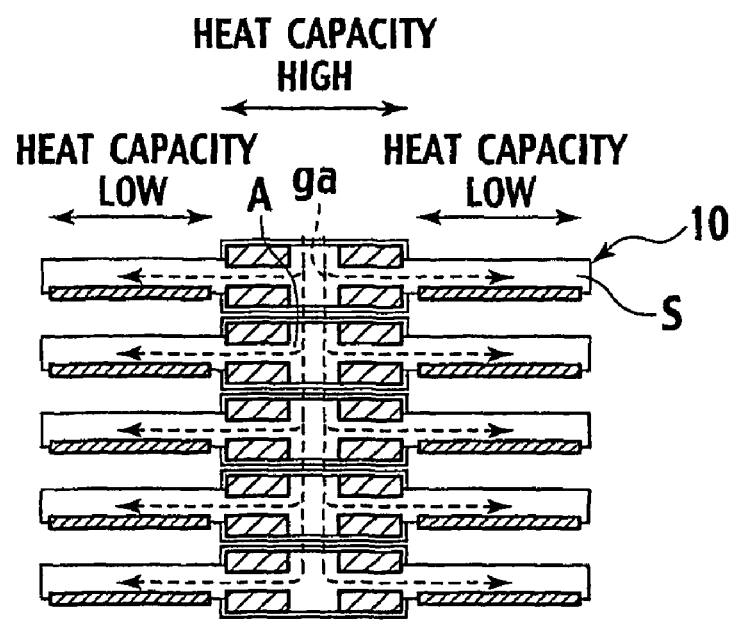
FIG. 20 is a cross sectional and illustrative view, based on a position corresponding to line a-a of FIG. 1, of a fuel cell stack structure with no priority for the heating to be performed.
Figure 21:
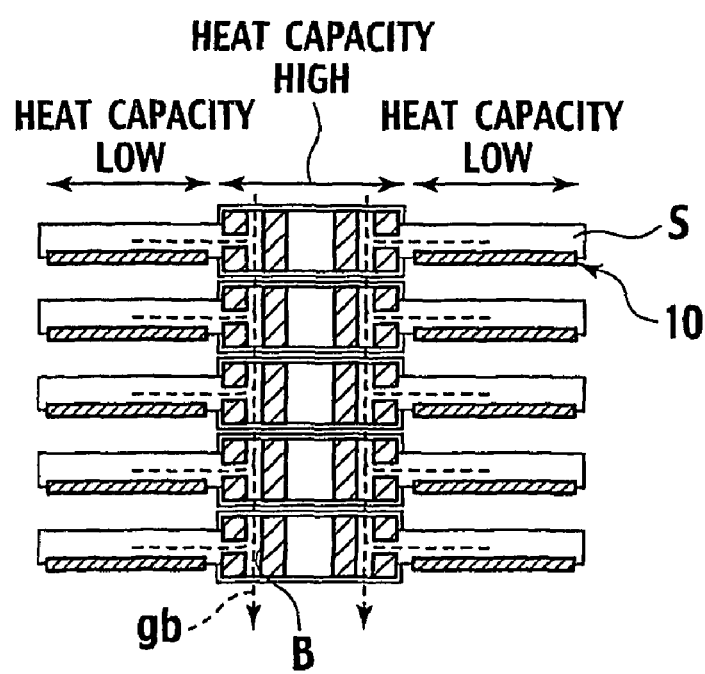
FIG. 21 is a cross sectional and illustrative view, based on a position corresponding to line b-b of FIG. 1, of the fuel cell stack structure with no priority for the heating to be performed.

Now, with the fuel cell stack structure according to the present invention, as shown in FIG. 20, high temperature gas ga passes across a supply flow passage A, formed in a central flow channel area with high-heat capacity, and is distributed to each cell space S defined between stacked cells. Then, as shown in FIG. 21, gas gb, passing across the units 10 upon generation of electric power, flows through an exhaust flow passage B, formed in the central flow channel area with high-heat capacity, and is exhausted to the outside through the respective cell space areas S. Thus, such flow channels form a flow path used for generating electric power.

In contrast, if a short-circuit flow channel is formed in a way to preclude high temperature gas from passing across the cell space areas S while causing high temperature gas to pass through only the central flow channel area with high-capacity upon which high temperature gas is exhausted to the outside, only the center area can be selectively heated.

Therefore, the present invention takes the form of a structure that includes a short-circuit flow channel operative to allow a major amount of high temperature gas, to be supplied to respective cell space areas S of the units 10 from a gas flow channel, to be exhausted intact, and a flow channel control device operative to restore a status under which the short-circuit flow channel is closed to cause the gas flow channel to supply high temperature gas to the cell space areas S of the units 10 whereby at a start of the heating during startup, the operation is executed to preferentially heat only an area, with high-heat capacity, of a central flow channel at a position close proximity to the gas flow channel of the units.

A fuel cell stack structure of the present embodiment can be adopted employing a fuel cell stack structure including a gas flow channel of the type wherein fuel gas is supplied through a central flow channel and unburned fuel, which has not been used for generating electric power, is exhausted from cell plates at outer areas thereof to allow unburned fuel to be mixed with air gas at an area close proximity to an outer periphery of the fuel cell stack structure for combustion. Even with such a structure, closing a valve in the short-circuit flow channel allows a rate of gas admitted to the respective cell space areas to increase and opening the valve in the short-circuit flow channel enables an increase in a ratio of gas flowing from the respective cell space areas into the short-circuit flow channel.

With the use of a fuel cell stack structure having such a structure, no need arises for a complicated moving element to be located in an area exposed to high temperatures, making it possible to simply alter an area into which gas flows, that is, a heating area. Further, even during a cooling period in which the temperature of the fuel cell stack structure is lowered subsequent to a stop in operation to generate electric power, the temperature of the fuel cell stack structure can be lowered while minimizing a temperature difference between the area with high-heat capacity and an area with low-heat capacity.

In such a case, providing a circulation flow channel to cause high temperature gas, exhausted from the short-circuit flow channel, to be returned to a gas flow channel enables high temperature gas to circulate, resulting in reduction of the amount of exhaust emission while enabling only the center area to be efficiently raised in temperature.

Further, a ratio of flow rates between high temperature gas, flowing from the central flow channel of the fuel cell stack structure into the respective cell space areas, and high temperature gas, flowing into the short-circuit flow channel, depends on the magnitude of resistance between the flow passage leading to the units and the short-circuit flow channel. A gas supply port, leading to each cell space area, has a smaller opening surface area than that of the gas flow channel and, in addition, a current collector element, made of a mesh-like element or a foam, is inserted to an internal space of the cell space areas, resulting in an increase in flow resistance. Accordingly, if the flow resistance of the short-circuit flow channel becomes less than that of the units, the flow of gas dominates in the short-circuit flow channel, resulting in the occurrence for only the center area to be heated.

The flow rate of gas, flowing into the short-circuit flow channel, that is, the opening degree of a valve, functioning as a flow channel control device, disposed in an exhaust side may be preferably varied depending on time or the temperature of the fuel cell stack structure. Thus, the present invention makes it possible to adopt a structure that includes a temperature sensor, disposed in at least one position in an interior of the fuel cell stack structure, and a controller operative to actuate the flow channel control device in response to a temperature, detected by the temperature sensor, for regulating the flow rate of high temperature gas to be exhausted through the short-circuit flow channel.

Thermocouples, each functioning as a temperature sensor, are fixedly mounted on two positions, respectively, including an area (central flow channel area) with high-heat capacity and another area (outer area) with low-heat capacity, for monitoring temperatures at the respective locations. Closing the exhaust valve at the stage of the temperature of the center area exceeding a certain level causes gas to flow nowhere else, permitting gas to flow into the respective cell space areas. As a result, the outer area of the fuel cell stack structure can be heated subsequent to the heating of the central flow channel area. That is, a whole of the fuel cell stack structure can be rapidly heated, resulting in a uniform temperature distribution pattern during temperature rise.

Accordingly, the temperature rising rate of the outer area can be regulated upon adjusting the opening degree of the exhaust valve. If the flow rate of high temperature gas, admitted to the central gas flow channel, excessively increases, less heat exchange takes place with the resultant decrease in the temperature rising rate of the central flow channel. Therefore, probabilities occur wherein during the operation to heat the central flow channel, a need arises for regulating the flow rate of gas flowing through the exhaust gas flow channel for adjusting the temperature rising rate.

When this takes place, if no difference exists in flow resistance between a flow passage leading to the each cell space area and a short-circuit flow channel, the flow rate of high temperature gas, admitted to the respective cell space areas, increases, resulting in an incapability for the central flow channel area to be selectively heated. With such fuel cell stack structure, it may be preferable to provide a closure device, such as a shutter, which opens and closes a gas supply port that provides fluid communication between the central gas flow channel and each of the respective cell space areas. With the use of such a structure, an area to be heated can be altered even in the absence of a difference in flow resistance between the relevant flow passages.

In an alternative configuration, a metallic circular cylinder may be prepared in tight contact with a wall surface of the central gas flow channel. The metallic circular cylinder may be formed with a bore at a position in alignment with the gas supply port and the cylinder may be lifted and lowered or rotated for thereby opening and closing the gas supply port.

Further, another structure may be configured such that one end of a small segment, made of a stack of materials different in thermal expansion coefficient, is boded to a portion close proximity to a gas supply port or an interior of the gas supply port whereby at a stage heating the center area, the small segment undergoes deformation due to difference in thermal expansion coefficients of the small segment for opening the gas supply port, making it possible to obtain the same shutter mechanism as that set forth above. More particularly, a heat resistant stainless steel plate with a thickness of approximately 50 µm is formed with a film, made of ceramic such as alumina, with a thickness of 10 µm. With such a structure, thermal deformation will take place due to a difference in thermal expansion caused by temperature rise. The film of ceramic material may be preferably formed using a sputtering method, a CVD method and a spraying method.

Also, another structure may be adopted in combination wherein the gas flow channel has a wall surface that is formed with a convexo-concave portion, such as cavities, to have an increased heat receiving surface area. With such a structure, the heat receiving surface area is enlarged and turbulent flows tend to easily occur. Therefore, this makes it possible for high temperature gas to stay on the wall surface of the gas flow channel for an extended time period to cause heat exchange to easily occur. In particular, since flanges, located on top and bottom ends of the fuel cell stack structure, have large heat-capacity, convexo-concave portions may also be formed on the wall surfaces of the gas flow channel at areas close proximity to the flanges.

Furthermore, the present invention may take the form of a structure wherein a combustor is supplied with fuel gas and air gas for combustion to provide heat that is used as heated medium in a heat exchanger to heat gas, flowing into the gas flow channel, to provide high temperature gas for raising a temperature of a fuel cell stack structure, that is, a structure that includes a combustor, in which fuel gas is combusted, and a heat exchanger configured to heat gas, flowing into the gas flow channel, to provide high temperature gas.

With the use of such a structure, high temperature gas is obtained without using gas other than fuel gas and electricity. When this takes place, heating gas may include any of oxidizer gas and fuel gas to be pertinent especially when the interiors of the units include fuel electrodes to which reducing gas is caused to flow for raising the temperature.

Moreover, the present invention may take the form of a structure wherein high temperature combustion exhaust gas, generated in the combustor, can be used intact as heating gas, that is, a structure that includes a combustor configured to combust fuel gas for producing high temperature combustion exhaust gas that flows to the gas flow channel, thereby making it possible to obtain high temperature gas without using electricity or gas other than fuel gas. However, since oxidizer gas flows into the interiors of the units, it is needed to coat the fuel electrodes, current collectors and separators for preventing oxidizing when the interiors include the fuel electrodes.

In addition, the present invention may take the form of a structure that includes an electrical heating mechanism disposed in a gas conduit, to which the gas flow channel is connected, to heat gas flowing into the gas flow channel. In particular, a resistor wire or electric heater is wound on an outside of the gas conduit to which the gas flow channel is connected. In such a case, heating gas may include any of oxidizer gas and fuel gas to be pertinent especially when the interiors of the units include fuel electrodes to which reducing gas is caused to flow for raising the temperature.

Furthermore, although the present invention makes it possible for a fuel cell stack structure to have a center area that is heated, after which a flow passage is changed, to enable the heating of respective cell space areas, in cases where the respective cell space areas have low-heat capacity or where separator plates or cell plates have favorable heat conductivities, temperatures of these component parts are raised following the heating of the center area due to heat conducted from the central gas flow channel to the separator plates or the cell plates.

With the fuel cell stack structure of the present invention, since an increase in thickness of a cell plate or a separator, each playing a role as an area with low-heat capacity in each cell space, leads to an increase in weight and heat capacity, a thickness of the cell plate or separator plate may be preferably thinned as less as possible. However, if these component parts have excessively thin thickness, then, a drop occurs in strength with the resultant deterioration in strength of supporting the simplex cells. Thus, it may be preferably structured such that an area, with low-heat capacity, of a unit is formed of a rolled thin plate with a thickness of 0.05 mm to 0.5 mm. With such a structure, the cell space areas may be possibly heated due to heat conducted from the gas flow channel of the fuel cell stack structure. In such a case, a whole of the fuel cell stack structure can be heated without the need for a functional component part, such as a shutter, and no need arises for performing switchover operation of the gas flow channel depending on the temperature variation of the center area, resulting in an increase in temperature rise at a high speed.

Moreover, with the fuel cell stack structure of the present invention, it may be structured such that a separator of a unit and a gas flow channel, extending through the separator, are formed of heat-resistant alloy composed of principal components such as Ni or Fe and containing Cr. The use of such a structure results in a capability for a fuel cell stack structure to enhance a long-term durability.

With the fuel cell stack structure incorporating simplex cells adapted to operate at temperatures greater than 400° C., a component part, other than cells, may preferably include material formed of Fe—Cr family alloy such as SUS316L, SUS430, ZMG and FeCrW. Although Ni family alloy, such as INCONEL, may be utilized, there is a need for selecting material so as to minimize a mismatch in thermal expansion coefficient with material of a unit cell to be fixedly mounted on a sell substrate.

With the formation of such a structure, a temperature rising speed can be increased and heat efficiently transfers from the heated center area, making it possible to perform the temperature rise followed by the temperature variation of the center area while enabling the realization of reduction in size and weight to be suitable for on-vehicle application.

In addition, with the fuel cell stack structure of the present invention, a structured may be provided that includes a solid oxide type simplex cell that are mounted on an area with low-heat capacity in each cell space area. Such a structure may be appropriately installed on a vehicle due to the presence of resistance to thermal shock caused during startup or halt and the presence of an increase in a structural durability.

Also, it doesn't matter if a simplex cell is of an electrode support type or an electrolyte support type. No object exists if the simplex cell has a shape with a size falling in an area, with low-heat capacity, of the cell plate. In cases where the cell plate or separator plate are made of metal, the fuel cell stack structure may be preferably operated at temperatures less than 700° C.

Also, while the present invention has been set forth above with reference to the solid electrolyte fuel cell, the present invention may have applications to other type of fuel cells that employ electrolyte formed of liquid or gel shape.

INDUSTRIAL APPLICABILITY

According to the present invention, with the structures set forth above, a temperature rising rate of an area with high-heat capacity can be improved to make it possible to suppress the occurrence of stress concentration due to a difference in temperature between the area with high-heat capacity and the other area with low-heat capacity while, in addition, making it possible to preclude a drop in temperature of gas flowing through a gas flow channel, resulting in extremely excellent advantages.

The invention claimed is:
1. A method of controlling a temperature of a fuel cell stack structure comprised of a plurality of stacked units, each of which has a solid electrolyte simplex cell, accommodated in a cell space area surrounded by a metallic thin separator and a cell plate disposed in a position opposite to the separator, wherein one surface of the solid electrolyte simplex cell is exposed to an outside, wherein a gas intake bore and a gas exhaust bore are disposed in a substantial center of each of the metallic thin separator and the cell plate, wherein a central flow channel member disposed in the substantial center between the metallic thin separator and the cell plate provides a gas intake and a gas exhaustion with respect to the cell space, wherein the gas intake bore, the gas exhaust bore, and the central flow channel member communicate with each other and form at least one gas flow channel in a substantial center of the stacked units, and wherein during a stage from startup and stop operations of the fuel cell stack structure, gas is supplied from the at least one gas flow channel, extending through the units, to the respective cell space areas, the method comprising the steps of:

measuring temperatures at a plurality of areas; and controlling a heat balance between associated areas depending on temperature information, resulting from measurements, in order to provide uniform temperature distribution.

2. The method of controlling a temperature of a fuel cell stack structure according to claim 1, wherein:

the temperatures are measured at two positions different in at least heat capacity; and a heat balance related to the two positions is controlled upon regulating at least any one of a flow rate of gas, flowing into the fuel cell stack structure, and a flow rate of exhaust gas depending on temperature information resulting from the measured temperatures.

3. The method of controlling a temperature of a fuel cell stack structure according to claim 2, wherein high temperature gas, to be supplied to the cell space areas from the gas flow channel, is exhausted through the gas flow channel for heating an area with high-heat capacity in a vicinity of the gas flow channel of the units so as to minimize a difference in the temperatures, measured at the two positions, while increasing the flow rate of gas flowing into the fuel cell stack structure depending on needs.

4. The method of controlling a temperature of a fuel cell stack structure according to claim 3, wherein at a stage at which at least one of the temperatures, measured at the two positions, exceeds a predetermined temperature, a whole of the high temperature gas, exhausted through the gas flow channel, is supplied to the cell space areas and only the flow rate of gas supplied to the fuel cell stack is regulated.

5. The method of controlling a temperature of a fuel cell stack structure according to claim 3, wherein the high temperature gas, which is exhausted, is returned to the gas flow channel for circulation.

6. The method of controlling a temperature of a fuel cell stack structure according to claim 3, wherein gas heated upon heat exchange with combustion heat resulting from combusting of fuel gas is used as high temperature heating gas flowing through the gas flow channel.

7. The method of controlling a temperature of a fuel cell stack structure according to claim 3, wherein high temperature combustion exhaust gas, resulting from combustion of fuel gas, is used as high temperature heating gas flowing through the gas flow channel.

8. The method of controlling a temperature of a fuel cell stack structure according to claim 3, wherein gas, heated by an electric heating mechanism placed on a gas conduit to which the gas flow channel is connected, is used as high temperature heating gas flowing through the gas flow channel.

9. The method of controlling a temperature of a fuel cell stack structure according to claim 2, wherein at least either one of the flow rate of gas, flowing into the fuel cell stack structure, and the flow rate of exhaust gas is controlled in a way to minimize a difference between a predetermined temperature at an arbitrary time, calculated based on a predetermined temperature rising time or temperature rising rate, and a highest measured temperature among a plurality of temperature information resulting from measurements.

10. The method of controlling a temperature of a fuel cell stack structure according to claim 2, wherein at least either one of the flow rate of gas, flowing into the fuel cell stack structure, and the flow rate of exhaust gas is controlled in a way to minimize a difference between a predetermined temperature at an arbitrary time, calculated based on a predetermined temperature drop time or temperature drop rate, and a lowest measured temperature among a plurality of temperature information resulting from measurements.

11. The method of controlling a temperature of a fuel cell stack structure according to claim 1, wherein a heat balance, related to respective cell space areas, is controlled upon permitting a high temperature gas or a low temperature gas to flow to a temperature regulating gas flow channel, independent from the gas flow channel for supplying gas to the respective cell space areas of the units for generating electric power, depending on temperature information obtained upon measuring temperatures at a plurality of areas.

12. The method of controlling a temperature of a fuel cell stack structure according to claim 11, wherein gas, cooled in heat exchange with air or water in a heat radiator, is used as the low temperature gas for cooling.

* * * * *